United States Patent [19]

Mullins et al.

[11] Patent Number: 5,411,727

[45] Date of Patent: May 2, 1995

[54] METHOD FOR THE DISSOLUTION OF CALCIUM CARBONATE SOLIDS IN THE PRESENCE OF AQUEOUS CHLORINE SOLUTIONS

[75] Inventors: Richard M. Mullins, Madison; Jeffrey J. Glen, Meriden, both of Conn.

[73] Assignee: Olin Corporation, Stamford, Conn.

[21] Appl. No.: 288,119

[22] Filed: Aug. 10, 1994

[51] Int. Cl.$^6$ .......................... B01F 1/00; C07C 59/08
[52] U.S. Cl. .................... 423/658.5; 562/589
[58] Field of Search .................. 562/589; 423/658.5

[56] References Cited

U.S. PATENT DOCUMENTS

| | | | |
|---|---|---|---|
| 2,009,753 | 7/1935 | Urbain | 562/589 |
| 2,046,610 | 7/1936 | Dale | 562/589 |
| 4,420,636 | 12/1983 | Juengst et al. | 562/589 |
| 4,867,196 | 9/1989 | Zetena et al. | 137/268 |
| 5,133,381 | 7/1992 | Wood et al. | 137/268 |

FOREIGN PATENT DOCUMENTS

| | | |
|---|---|---|
| 54-063107 | 5/1979 | Japan . |
| 140727 | 5/1987 | Poland . |
| 145546 | 9/1988 | Poland . |
| 246278 | 1/1926 | United Kingdom ............ 562/589 |
| 443705 | 2/1936 | United Kingdom ............ 562/589 |

OTHER PUBLICATIONS

Ecologically Harmless Technology for the Chemical Treatment of Inside Surfaces of Boiler Equipment with Lactic Acid, Zhuravleva, E. Yu., et al. Prom. Energ. 7, 33–35.

Cationic Surfactants in Organic Acid–Based Hard Surface Cleaners, Roerig, H. and Stephan, R., Comun. Jorn. Co. Esp. Deterg. 21, 191–206.

*Primary Examiner*—Wayne Langel
*Attorney, Agent, or Firm*—William A. Simons

[57] ABSTRACT

A process for dissolving calcium carbonate solids in the presence of an aqueous chlorine-containing solution without the formation of chlorine gas comprising adding a sufficient amount of lactic acid to the solution dissolving said solids.

4 Claims, No Drawings

METHOD FOR THE DISSOLUTION OF CALCIUM CARBONATE SOLIDS IN THE PRESENCE OF AQUEOUS CHLORINE SOLUTIONS

BACKGROUND OF THE INVENTION

1. Field of the Invention

The present invention relates to a process for dissolution of calcium carbonate-containing solids (either in the form of a hard scale or a soft residue) in a treatment zone such as a swimming pool chlorinator using a lactic acid solution.

2. Brief Description of the Art

Chlorinated water is commonly used to sanitize swimming pools, spas, and hot tubs. Chlorinators such as the PULSAR ® II chlorinator made by Olin Corporation provide a source of the chlorinated water for the pools and the like.

One of the most difficult problems in the use of chlorine solutions of hard water is the removal of calcium carbonate scale and residues from the operating surfaces of the chlorinator and the pool or the like. Removal of this scale and residue is difficult and time-consuming. In the past, the standard cleaning procedure was for the chlorinator to be emptied, rinsed, disassembled and its components cleaned with a mineral acid (preferably hydrochloric acid). This is time-consuming and costly. Moreover, when mineral acids such as hydrochloric acid are used, the potential of forming extremely irritating chlorine gas fumes, exist.

Accordingly, a better method of removing calcium carbonate solids from the chlorinator and the pool surface without having to disassemble the chlorinator and the risk of forming these chlorine gas fumes is needed. The present invention is a solution to that need.

Separately, lactic acid has been used as a calcium silicate scale remover for boilers. See *Ecologically harmless technology for the chemical treatment of inside surfaces of boiler equipment with lactic acid*, Zhuravleva, E. Yu., et al. Prom Energ., 7, 33–5; *Method of removing calcium containing boiler scale and water circuit scale*, Gruszkowski, H. et al. Polish Patent PL 145546 (30 Sept. 1988); and *Cleaning and washing agent for boiler scale and deposits from heat exchange surfaces*, Kwiatkowski, B. Polish Patent PL 140727 (30 May 1987).

Lactic acid also has been used in hard surface cleaners. See *Cationic surfactants in organic acid-based hard surface cleaners*, Roerig, H. and Stephan, R., Comun. Jorn. Com. Esp. Deterg. 21, 191–206.

Lactic acid has also been employed as a metal descaling agent. See *Metal descaling agent*, Negoro, E. et al., Japanese patent JP 54063107 (21 May 1979).

However, none of these references teach the use of lactic acid in the dissolving of calcium carbonate solids in the presence of aqueous chlorine solutions.

BRIEF SUMMARY OF THE INVENTION

Therefore, the present invention is directed to a process for dissolving calcium carbonate solids in the presence of an aqueous chlorinated solution comprising the step of adding a sufficient amount of lactic acid to the aqueous chlorinated solution containing said calcium carbonate solids to dissolve said solids into said solution.

DESCRIPTION OF PREFERRED EMBODIMENTS

The preferred treatment zone of the present invention is the operating surfaces of a standard pool chlorinator. One example of a pool chlorinator is the PULSAR II chlorinator sold by Olin Corporation. This chlorinator is described by U.S. Pat. Nos. 4,867,196 (Zetena et al.) and 5,133,381 (Wood et al.). Other treatment areas that could be treated by the present invention include wall surfaces of swimming pools, spas, and hot tubs as well as equipment (e.g., piping) associated with such pools, spas, and hot tubs.

After removal of the concentrated solid chlorine-containing source material (i.e., calcium hypochlorite tablets, briquettes or trichloro-isocyanuric acid tablets or the like), generally the lactic acid solution is added directly into the dissolving chamber of the chlorinator. The dissolving chamber will generally contain an aqueous chlorinated solution having calcium carbonate-containing solids therein. These solids may be in the form of a hard scale on the bottom and side surfaces of the chlorinator or a soft residue mass at the bottom of the chlorinator's dissolving chamber. The lactic acid solution may be any commercially available lactic acid solution. Preferably, aqueous lactic acid solutions having 10% to 50% lactic acid concentrations are employed.

As stated above, the amount of lactic acid added should be sufficient to dissolve the calcium carbonate-containing solids into the aqueous chlorinated solution. Without being so limited, this dissolving is believed to occur by the chemical conversion of the calcium carbonate to calcium lactate. The latter is significantly more soluble in water than the former.

Unlike HCl addition, no highly corrosive or irritating acid fumes are generated with the addition of lactic acid to the aqueous chlorinated solution containing these solids.

The preferred amount of lactic acid (on a pure basis) added to calcium carbonate solids is from 0.5:1 to 10:1 by weight.

The combined lactic acid/aqueous chlorinated solution should be kept together for a period ranging from less than 10 minutes for soft residue to several hours when dense, hard scale is being dissolved. Preferably, this treatment should be periodically repeated, for example, once a week.

The aqueous lactic acid/chlorinated solution containing the dissolved solids may then be removed from the treatment zone (e.g., chlorinator bottom and walls) by pumping this solution either to waste or to the pool filter.

The following Examples and Comparisons further illustrate the present invention. All parts and percentages are by weight and all temperatures are degrees Celsius, unless explicitly stated otherwise.

EXAMPLE 1

A large (100,000 gallon) commercial swimming pool was equipped with a PULSAR II Chlorinator. After a period of time, it was observed that the dissolving chamber of the PULSAR II Chlorinator contained a slurry composed of pool water and calcium carbonate scale and residue. The depth of the chlorinated liquid was approximately 6 cm and contained approximately 100 grams of solid calcium carbonate. The liquid portion of the slurry also contained available chlorine concentration of approximately 500 mg/l.

An aqueous lactic acid solution (25% by weight) (500 ml) was added to the slurry in the dissolving chamber. A rapid reaction ensued with complete dissolution of the scale and residue within ten minutes. No visual or olfactory evidence of chlorine gas was observed.

COMPARISON 1

The same PULSAR II Chlorinator treated in Example 1 was allowed to build-up another similar slurry of calcium carbonate in the dissolving chamber.

An aqueous hydrochloric acid solution (approximately 25% concentration) (500 ml) was added to the residue-covered dissolving chamber. The same bubbling reaction and dissolution of calcium carbonate residue was observed; however, a greenish-yellow cloud and chlorine-type odor was observed, and all personnel were forced to evacuate the immediate area.

EXAMPLE 2 AND COMPARISON 2-4

The following four (4) experiments were run to compare the results of using various acids for the dissolution of calcium carbonate residue in the presence of chlorine solutions. A one litter sample of pool water containing approximately 20 gms of calcium carbonate residue and 500 mg/liter of available chlorine, was obtained from a chlorinator that uses calcium hypochlorite as a source of chlorine. The sample was separated into four equal parts; approximately 250 mls was placed in four identical 1,000 ml beakers. Then, in a well-ventilated and acid-scrubbed laboratory hood, the calcium carbonate residue was dissolved by adding approximately 100 mls of a 25% (wt.) solution of four different acids. Observations were made during the addition to see if any chlorine gas was formed, as evidence by a greenish-yellow gas. The beakers were then allowed to sit undisturbed overnight to determine whether any precipitate formed. The table below shows the results:

| Example or Comparison | Acid | Dissolution of CaCO$_3$ | Chlor. Gas Formed | Precipitate Formed |
|---|---|---|---|---|
| C-2 | Hydrochloric acid | Yes | Yes-dense | No |
| C-3 | Citric acid | Yes | Yes-moderate | Yes |
| C-4 | Tartaric acid | Yes | Yes-moderate | Yes |
| C-5 | Lactic acid | Yes | No | No |

These results clearly show that lactic acid not only dissolved the calcium carbonate, but did so without forming chlorine gas or any potentially insoluble by-product (no precipitate).

The results in the table above also show the benefits of using lactic acid for the removal of calcium carbonate in the presence of aqueous chlorine solutions. Strong mineral acids, e.g., hydrochloric acid, are currently used to clean calcium carbonate residue and scale from water treatment equipment surfaces. These acids generate chlorine gas unless all of the aqueous chlorine is removed first (e.g., with sodium sulfite, thiosulfate, etc.). It was anticipated that weaker organic acids like citric and tartaric acid, might not form chlorine gas when added to dilute aqueous solutions of chlorine. The data above show that this is not the case. Surprisingly, however, lactic acid does not form chlorine gas when added to dilute aqueous solutions of chlorine.

An additional benefit is that lactic acid forms a soluble by-product, i.e., calcium lactate. This prevents the unwanted deposition of a solid product on swimming pool or equipment surfaces. Both citric and tartaric acids formed relatively insoluble by-products that precipitated overnight. These could potentially cause problems with filter or pump blockages, or the formation of solids either in the pool itself or on the solid surfaces of the pool.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A process for dissolving calcium carbonate solids in an aqueous chlorinated solution without the formation of chlorine gas comprising the step of adding a sufficient amount of lactic acid to said aqueous chlorinated solution to dissolve said solids into said solution.

2. The process of claim 1 wherein the weight ratio of lactic acid to said solids is from about 0.5:1 to about 10:1.

3. The process of claim 1 wherein said lactic acid is added in the form of a 10% to 50% by weight aqueous lactic acid solution.

4. The process of claim 1 wherein the treatment zone containing said aqueous chlorinated solution is a swimming pool chlorinator.

* * * * *